(12) United States Patent
Withiam et al.

(10) Patent No.: US 7,377,965 B2
(45) Date of Patent: May 27, 2008

(54) AIR FILTRATION MEDIA COMPRISING METAL-DOPED SILICON-BASED GEL MATERIALS

(75) Inventors: Michael C. Withiam, Landenberg, PA (US); Fitzgerald A. Sinclair, Bear, DE (US); David K. Friday, Cockeysville, MD (US)

(73) Assignee: J.M. Huber Corporation, Edison, NJ (US)

( * ) Notice: Subject to any disclaimer, the term of this patent is extended or adjusted under 35 U.S.C. 154(b) by 378 days.

(21) Appl. No.: 11/156,511

(22) Filed: Jun. 20, 2005

(65) Prior Publication Data

US 2007/0012191 A1    Jan. 18, 2007

(51) Int. Cl.
*B01J 20/02* (2006.01)
*C01C 1/12* (2006.01)

(52) U.S. Cl. .................... 96/153; 423/338
(58) Field of Classification Search ............ 96/108, 96/153; 95/128, 900; 502/400, 407, 408; 423/338
See application file for complete search history.

(56) References Cited

U.S. PATENT DOCUMENTS

| | | | |
|---|---|---|---|
| 1,537,519 A | 5/1925 | Yablick | |
| 4,287,752 A * | 9/1981 | Ury | ............... 73/23.38 |
| 4,572,178 A | 2/1986 | Takase et al. | |
| 5,053,169 A | 10/1991 | Price | |
| 5,063,196 A | 11/1991 | Doughty et al. | |
| 5,977,212 A | 11/1999 | Ebner et al. | |
| 5,985,169 A | 11/1999 | Miller et al. | |
| 6,046,131 A * | 4/2000 | Tanihara | ............... 502/406 |
| 6,670,302 B2 | 12/2003 | Glemza et al. | |
| 6,796,896 B2 | 9/2004 | Laiti | |
| 2007/0003762 A1* | 1/2007 | Withiam et al. | ............ 428/403 |

FOREIGN PATENT DOCUMENTS

| | | |
|---|---|---|
| GB | 280947 | 2/1929 |
| WO | 00/40324 | 7/2000 |

OTHER PUBLICATIONS

Wason, Satish K., "Silica Gels", Pigment Handbook: vol. 1, pp. 175-181, 1988, John Wiley & Sons, Inc.

* cited by examiner

*Primary Examiner*—Frank M. Lawrence
(74) *Attorney, Agent, or Firm*—William Parks

(57) ABSTRACT

The present invention relates generally to an environmental control unit for use in air handling systems that provides highly effective filtration of noxious gases (such as ammonia). Such a filtration system utilizes novel metal-doped silica-based gels to trap and remove such undesirable gases from an enclosed environment. Such gels exhibit specific porosity requirements and density measurements. Furthermore, in order for proper metal doping to take effect, such gels must be treated while in a wet state. The combination of these particular properties and metal dopant permits highly effective noxious gas filtration such that uptake and breakthrough results are attained, particularly in comparison with prior silica gel filtration products. Methods of using and specific filter apparatuses are also encompassed within this invention.

14 Claims, 4 Drawing Sheets

AIR FILTRATION MEDIA COMPRISING METAL-DOPED SILICON-BASED GEL MATERIALS

FIELD OF THE INVENTION

The present invention relates generally to an environmental control for use in air handling systems that provides highly effective filtration of noxious gases (such as ammonia). Such a filtration system utilizes novel metal-doped silica-based gels to trap and remove such undesirable gases from an enclosed environment. Such gels exhibit specific porosity requirements and density measurements. Furthermore, in order for the most effective metal doping to take effect, such gels are preferably treated with a multivalent metal salt while in a wet state. The combination of these particular properties and metal dopant permits highly effective noxious gas filtration such that excellent uptake and breakthrough results are attained, particularly in comparison with prior media filtration products. Methods of using and specific filter apparatuses are also encompassed within this invention.

BACKGROUND OF THE INVENTION

There is an ever-increasing need for air handling systems that include air filtration systems that can protect an enclosure against noxious airborne vapors and particulates released in the vicinity of the enclosure. Every year there are numerous incidents of noxious vapors contaminating building environments and causing illness and disruptions. There is also a current effort to protect buildings and other significant enclosures against toxic airborne vapors and particulates being released as part of terrorist acts. As a result, new filter design requirements have been promoted by the military to protect from certain toxic gases. Generally speaking, whether in a civilian or military setting, a typical air filtration system that contains only a particulate filter (for example, a cardboard framed fiberglass matt filter) provides no protection at all against toxic vapors. Commercially available electrostatic fiber filters exhibit higher removal efficiencies for smaller particles than standard dust filters, but they have no vapor filtration capability. HEPA ("High-Efficiency Particulate Air") filters are used for high-efficiency filtration of airborne dispersions of ultrafine solid and liquid particulates such as dust and pollen, radioactive particle contaminants, and aerosols. However, where the threat is a gaseous chemical compound or a gaseous particle of extremely small size (i.e., <0.001 microns), the conventional commercially-available HEPA filters cannot intercept and control those types of airborne agents.

The most commonly used filter technology to remove vapors and gases from contaminated air is activated carbon. Such carbon-based gas filtration has been implemented in a wide variety of vapor-phase filtration applications including gas masks and military vehicle and shelter protection. In these applications, activated carbon impregnated with metal salts is used to remove a full range of toxic vapors (such as arsine, Sarin gas, etc.). These toxic gases require a high filtration efficiency typically not needed for most commercial applications. To the contrary, typical commercial filters generally include activated carbon materials on or incorporated within non-woven fabrics (fiber mats, for instance), with coexisting large fixed beds of packed adsorbent particles. Such commercial filters used for air purification generally are used until an easily measurable percentage (e.g., 10%) of the challenge chemical(s) concentration is measured in the effluent. Greater long-term efficiency is desired for gas masks and/or military vehicle applications.

Impregnated, activated carbons are used in applications where required to remove gases that would not otherwise be removed through the use of unimpregnated activated carbons. Such prior art impregnated carbon formulations often contain copper, chromium and silver impregnated on an activated carbon. These adsorbents are effective in removing a large number of toxic materials, such as cyanide-based gases and vapors.

In addition to a number of other inorganic materials, which have been impregnated on activated carbon, various organic impregnates have been found useful in military applications for the removal of cyanogen chloride. Examples of these include triethylenediamine (TEDA) and pyridine-4-carboxylic acid.

Various types of high-efficiency filter systems, both commercial and military types, have been proposed for building protection using copper-silver-zinc-molybdenum-triethylenediamine impregnated carbon for filtering a broad range of toxic chemical vapors and gases. However, such specific carbon-based filters have proven ineffective for other gases, such as, ammonia, ethylene oxide, formaldehyde, and nitrogen oxides. As these gases are quite prominent in industry and can be harmful to humans when present in sufficient amounts (particularly within enclosed spaces), and, to date, other filter devices have proven unsuitable for environmental treatment and/or removal thereof, there exists a definite need for a filter mechanism to remedy these deficiencies, particularly in both high and low relative humidity (RH) environments. Each chemical is affected differently by adsorbed water. For ammonia, it is most difficult (design limiting) to filter at a low relative humidity since adsorbed water actually enhances the ammonia affinity of the target adsorbents. For ethylene oxide the reverse is true since exposure to high humidity is problematic in designing a proper filter system. To date, no filtration system having a relatively small amount of filter medium present has been provided that effectively removes such gases at their design limiting RH for long durations of time at relatively high challenge concentrations (e.g., 1,000 ppm) without eventually eluting through the filter.

It has been realized that silica-based compositions make excellent gas filter media. However, little has been provided within the pertinent prior art that concerns the ability to provide uptake and breakthrough levels by such filter media on a permanent basis and at levels that are acceptable for large-scale usage. Uptake basically is a measure of the ability of the filter medium to capture a certain volume of the subject gas; breakthrough is an indication of the saturation point for the filter medium in terms of capture. Thus, it is highly desirable to find a proper filter medium that exhibits a high uptake (and thus quick capture of large amounts of noxious gases) and long breakthrough times (and thus, coupled with uptake, the ability to not only effectuate quick capture but also extensive lengths of time to reach saturation). The standard filters in use today are limited for noxious gases, such as ammonia, to slow uptake and relatively quick breakthrough times. There is a need to develop a new filter medium that increases uptake and breakthrough, as a result.

The closest art concerning the removal of gases such as ammonia utilizing a potential silica-based compound doped with a metal is taught within WO 00/40324 to Kemira Agro Oy. Such a system, however, is primarily concerned with providing a filter media that permits regeneration of the collected gases, presumably for further utilization, rather than permanent removal from the atmosphere. Such an ability to easily regenerate (i.e., permit release of captured gases) such toxic gases through increases of temperature or changes in pressure unfortunately presents a risk to the subject environment. To the contrary, an advantage of a system as now proposed is to provide effective long-duration breakthrough (thus indicating thorough and effective removal of unwanted gases in substantially their entirety from a subject space over time, as well as thorough and effective uptake of substantially all such gases as indicated by an uptake measurement. The Kemira reference also is concerned specifically with providing a dry mixture of silica and metal (in particular copper I salts, ultimately), which, as noted within the reference, provides the effective uptake and regenerative capacity sought rather than permanent and effective gas (such as ammonia) removal from the subject environment. The details of the inventive filter media are discussed in greater depth below.

BRIEF DESCRIPTION OF THE INVENTION

According to one aspect of this invention, a filter medium comprising multivalent metal-doped silicon-based gel materials, wherein said materials exhibit a BET surface area of between than 100 and 300 $m^2/g$; a pore volume of between about 0.18 cc/g to about 0.7 cc/g as measured by nitrogen porosimetry; a cumulative surface area measured for all pores having a size between 20 and 40 Å of between 50 and 150 $m^2/g$; and wherein the multivalent metal doped on and within said silicon-based gel materials is present in an amount of from 5 to 25% by weight of the total amount of the silicon-based gel materials. Preferably, the filter medium exhibits a BET surface area is between 150 $m^2/g$ and 250 $m^2/g$; a pore volume of between about 0.25 to about 0.5 cc/g; a cumulative surface area measured for all pores having a size between 20 and 40 Å of between 80 and 120 $m^2/g$; and wherein said multivalent metal is present in an amount of from about 8 to about 20%.

According to another aspect of the invention, a multivalent metal-doped silicon-based gel filter medium that exhibits a breakthrough measurement for an ammonia gas/air composition of at least 60 minutes a) when present as a filter bed of 1 cm in height within a flask of a diameter of 4.1 cm, b) when exposed to a constant ammonia gas concentration of 1000 $mg/m^3$ ammonia gas at ambient temperature and pressure, and c) when exposed simultaneously to a relative humidity of 15%; and wherein said filter medium, after breakthrough concentration of 35 $mg/m^3$ is reached, does not exhibit any ammonia gas elution in excess of said breakthrough concentration. Preferably, the breakthrough time is at least 120 minutes. Furthermore, another aspect of this invention concerns multivalent metal-doped silicon-based gel materials that exhibit a breakthrough time of at least 60 minutes when exposed to the same conditions as listed above and within the same test protocol, except that the relative humidity is 80%. Preferably, the breakthrough time for such a high relative humidity exposure test example is at least 120 minutes, as well.

According to still another aspect of the invention, a method of producing metal-doped silicon gel-based particles is provided, said method comprising the sequential steps of:
 a) providing a silicon-based gel material;
 b) wet reacting said silicon-based gel material with at least one multivalent metal salt to produce metal-doped silicon-based gel material; and
 c) drying said multivalent metal-doped silicon-based gel materials.

Alternatively, step "a" may include a production step for generating said silicon-based gel materials.

One distinct advantage of this invention is the provision of a filter medium that exhibits highly effective ammonia uptake and breakthrough properties when present in a relatively low amount and under a pressure typical of an enclosed space and over a wide range of relative humidity. Among other advantages of this invention is the provision of a filter system for utilization within an enclosed space that exhibits a steady and effective uptake and breakthrough result for ammonia gas and that removes such noxious gases from an enclosed space at a suitable rate for reduction in human exposure below damage levels. Yet another advantage is the ability of this invention to irreversibly prevent release of noxious gases once adsorbed, under normal conditions.

Also, said invention encompasses a filter system wherein at least 15% by weight of such a filter medium has been introduced therein. Furthermore, the production of such metal-doped silica-based material gel-like particles, wherein the reaction of the metal salt is preferably performed while the gel-like particle is in a wet state has been found to be very important in provided the most efficient and thus best manner of incorporating such metal species within the micropores of the subject silica materials. As such, it was determined that such a wet gel doping step was necessary to provide the most efficient filter medium and overall filter systems for such noxious gas (such as, as one example, ammonia).

One distinct advantage of this invention is the provision of a filter medium that exhibits highly effective ammonia uptake and breakthrough properties when present in a relatively low amount and under a pressure typical of an enclosed space and over a wide range of relative humidity. Among other advantages of this invention is the provision of a filter system for utilization within an enclosed space that exhibits a steady and effective uptake and breakthrough result for ammonia gas and that removes such noxious gases from an enclosed space at a suitable rate for reduction in human exposure below damage levels. Yet another advantage is the ability of this invention to irreversibly prevent release of noxious gases once adsorbed, under normal conditions.

DETAILED DESCRIPTION OF THE INVENTION

For purposes of this invention, the term "silicon-based gel" is intended to encompass materials that are formed from the reaction of a metal silicate (such as sodium silicate) with an acid (such as sulfuric acid) and permitted to age properly to form a gel material or materials that are available from a natural source (such as from rice hulls) and exhibit pore structures that are similar to such gels as formed by the process above. Such synthetic materials may be categorized as either silicic acid or polysilicic acid types or silica gel types, whereas the natural source materials are typically harvested in a certain form and treated to ultimately form the final gel-like product (such a method is provided within U.S. Pat. No. 6,638,354). The difference between the two synthetic categories lies strictly within the measured resultant pH level of the gel after reaction, formation and aging. If the gel exhibits a pH of below 3.0 after that stage, the gel is considered silicic or polysilicic acid in type. If pH 3.0 or above, then the material is considered a (traditional) silica gel. In any event, as noted above, the term "silicon-based gel" is intended to encompass both of these types of gel materials. It has been found that silicon-based gels exhibiting a resultant pH of less than 3.0 (silicic or polysilicic acid gels) contain a larger percentage of micropores of size less than 20' with a median pore size of about 30', while silicon-based gels exhibiting a higher acidic pH, such as pH of 3.0 and above (preferably, though not necessarily, as high as 4) contain a mixture of pore sizes having a median pore size of about 30' to about 60'. While not wishing to be held by theory, it is believed that capture of toxic gases, such as ammonia, is accomplished by two separate (but potentially simultaneous) occurrences within the pores of the metal-doped silicon-based gels: acid-base reaction and complexation reaction. Thus silicon-based gels formed at pH<2 contain more residual acid than the gels formed at pH 3-4, however the gels formed at pH 3-4 contain more pores of size suitable to entrap a metal, such as copper, and thus have more metal available for a complexation reaction. It is believed that the amount of a gas such as ammonia that is captured and held by the silicon-based gel results from a combination of these two means. The term "multivalent metal salt" is intended to include any metal salt having a metal exhibiting a valence number of at least three. Such a multivalent metal is particularly useful to form the necessary complexes with ammonia; a valence number less than three will not readily form such complexes.

The hydrous silicon-based gels that are used as the base materials for metal doping as well as the basic materials for the desired air filtration medium may be prepared from acid-set silica hydrogels. Silica hydrogel may be produced by reacting an alkali metal silicate and a mineral acid in an aqueous medium to form a silica hydrosol and allowing the hydrosol to set to a hydrogel. When the quantity of acid reacted with the silicate is such that the final pH of the reaction mixture is acidic, the resulting product is considered an acid-set hydrogel. Sulfuric acid is the most commonly used acid, although other mineral acids such as hydrochloric acid, nitric acid, or phosphoric acid may be used. Sodium or potassium silicate may be used, for example, as the alkali metal silicate. Sodium silicate is preferred because it is the least expensive and most readily available. The concentration of the aqueous acidic solution is generally from about 5 to about 70 percent by weight and the aqueous silicate solution commonly has an $SiO_2$ content of about 6 to about 25 weight percent and a molar ratio of $SiO_2$ to $Na_2O$ of from about 1:1 to about 3.4:1.

The alkali metal silicate solution is added to the mineral acid solution to form a silica hydrosol. The relative proportions and concentrations of the reactants are controlled so that the hydrosol contains about 6 to about 20 weight percent $SiO_2$ and has a pH of less than about 5 and commonly between about 1 to about 4. Generally, continuous processing is employed and alkali silicate is metered separately into a high speed mixer. The reaction may be carried out at any convenient temperature, for example, from about 15 to about 80° C. and is generally carried out at ambient temperatures.

The silica hydrosol will set to a hydrogel in generally about 5 to about 90 minutes and is then washed with water or an aqueous acidic solution to remove residual alkali metal salts which are formed in the reaction. For example, when sulfuric acid and sodium silicate are used as the reactants, sodium sulfate is entrapped in the hydrogel. Prior to washing, the gel is normally cut or broken into pieces in a particle size range of from about ½ to about 3 inches. The gel may be washed with an aqueous solution of mineral acid such as sulfuric acid, hydrochloric acid, nitric acid, or phosphoric acid or a medium strength acid such as formic acid, acetic acid, or propionic acid.

Generally, the temperature of the wash medium is from about 27° C. to about 93° C. Preferably, the wash medium is at a temperature of from about 27° C. to about 38° C. The gel is washed for a period sufficient to reduce the total salts content to less than about 5 weight percent. The gel may have, for example, a $Na_2O$ content of from about 0.05 to about 3 weight percent and a $SO_4$ content of from about 0.05 to about 3 weight percent, based on the dry weight of the gel. The period of time necessary to achieve this salt removal varies with the flow rate of the wash medium and the configuration of the washing apparatus. Generally, the period of time necessary to achieve the desired salt removal is from about 0.5 to about 3 hours. Thus, it is preferred that the hydrogel be washed with water at a temperature of from about 27° C. to about 38° C. for about 0.5 to about 3 hours. In one potential embodiment, the washing may be limited in order to permit a certain amount of salt (such as sodium sulfate), to be present on the surface and within the pores of the gel material. Such salt is believed, without intending on being limited to any specific scientific theory, to contribute a level of hydration that may be utilized for the subsequent metal doping procedure to effectively occur as well as contributing sufficient water to facilitate complexation between the ammonia gas and the metal itself upon exposure.

In order to prepare hydrous silicon-based gels suitable for use in the filter media of this invention, the final gel pH upon completion of washing as measured in 5 weight percent aqueous slurry of the gel, may range from about 1.5 to about 5.

The washed silica hydrogel generally has a water content, as measured by oven drying at 105° C. for about 16 hours, of from 10 to about 60 weight percent and a particle size ranging from about 1 micron to about 50 millimeters. Alternatively the hydrogel is then dewatered to a desired water content of from about 20 to about 90 weight percent, preferably from about 50 to about 85 weight percent. Any known dewatering method may be employed to reduce the amount of water therein or conversely increase the solids content thereof. For example, the washed hydrogel may be dewatered in a filter, rotary dryer, spray dryer, tunnel dryer, flash dryer, nozzle dryer, fluid bed dryer, cascade dryer, and the like.

The average particle size referred to throughout this specification is determined in a MICROTRAC® particle size analyzer. When the water content of the hydrogel is greater than about 90 weight percent, the hydrogel may be pre-dried in any suitable dryer at a temperature and for a time sufficient to reduce the water content of the hydrogel to below about 85 weight percent to facilitate handling, processing, and subsequent metal doping.

Generally, the hydrogel materials after formation and aging are of very coarse sizes and thus should be broken apart to facilitate proper metal impregnation. Such a size reduction may be accomplished by various methods, including milling, grinding, and the like. One option, however, is to subject the hydrogel materials to high shear mixing during the metal doping procedure. In such a step, the particle sizes can be reduced to the sizes necessary for proper filter utilization. Alternatively, the hydrogel particles may be ground to relatively uniform particles sizes concurrently during doping or subsequent to the doping step. In such alternative manners, the overall production method can effectuate the desired homogeneous impregnation of the metal for the most effective noxious gas removal upon utilization as a filter medium.

Thus, in one possible embodiment, the silica hydrogel is wet ground in a mill in order to provide the desired average particle size suitable for further reaction with the metal dopant and the subsequent production of sufficiently small pore sizes for the most effective ammonia gas trapping and holding while present within a filter medium. For example, the hydrogels may be concurrently ground and dried with any standard mechanical grinding device, such as a hammer mill, as one non-limiting example. The ultimate particle sizes of the multivalent-metal impregnated (doped) silicon-based gel materials are dependent upon the desired manner of providing the filter medium made therefrom. Thus, packed media will require larger particle sizes (from 10 to 100 microns, for example) whereas relatively small particles sizes (from 1 to 20 microns, for example) may be utilized as extrudates within films or fibers. The important issue, however, is not the particle sizes in general, but the degree of homogeneous metal doping effectuated within the pores of the subject hydrogels themselves.

The hydrous silicon-based gel product after grinding preferably remains in a wet state (although drying and grinding may be undertaken, either separately or simultaneously; preferably, though, the materials remain in a high water-content state for further reaction with the metal dopant) for subsequent doping with a multivalent metal salt in order to provide effective ammonia trapping and holding capability within a filter medium. Such a wet state reaction is thus encompassed within the term "wet reaction" or "wet react" for this invention. Without intending on being bound to any specific scientific theory, it is believed that the wet state doping permits incorporation of sufficient metal species within the pores of the silicon-based gel product to permit sufficient complexation of the target ammonia. In a wet state, the pores of the subject silicon-based gel product are large enough in volume to allow for the metal salt to enter therein. Subsequent drying thus appears to shrink the pores around the resultant metal to a volume that, upon introduction of target ammonia gas, causes the ammonia to condense into a liquid. It is apparently this liquid that then exists within the small volume pores that will contact with the metal species to effectuate complexation therewith upon transfer of water present on the metal as hydrates. Thus, it is believed that the production of small volume pores around the metal species therein to a level wherein the remaining volume within such pores is small enough to permit such condensation of the target ammonia followed by reliable metal contact for the needed substantially permanent complexation for effective capture of the ammonia molecules is best provided through the wet state reaction noted above. Included as one possible alternative within the term "wet reaction" or "wet react" is the ability to utilize gel particles that have been dried to a certain extent and reacted with an aqueous multivalent metal salt solution in a slurry. Although the resultant performance of such an alternative filter medium does not equal that of the aforementioned product of pre-dried, wet, gel particles with a metal salt, such a filter medium does exhibit performance results that exceed gels alone, or dry-mixed metal-treated salt materials. Such an alternative method has proven effective and is essential when utilizing the natural source materials (from rice hulls, for example, and as noted above) as reactants with an aqueous multivalent metal salt solution.

The metals that can be utilized for such a purpose include, as alluded to above, any multivalent metal, such as, without limitation, cobalt, iron, manganese, zinc, aluminum, chromium, copper, tin, antimony, indium, tungsten, silver, gold, platinum, mercury, palladium, cadmium, and nickel. For cost reasons, copper and zinc are potentially preferred, with copper most preferred. The listing above indicates the metals possible for production during the doping step within the pores of the subject silicon-based gel materials. The metal salt is preferably water-soluble in nature and facilitates dissociation of the metal from the anion when reacted with silica-based materials. Thus, sulfates, chlorides, bromides, iodides, nitrates, and the like, are possible as anions, with sulfate, and thus copper sulfate, most preferred as the metal doping salt (cupric chloride is also potentially preferred as a specific compound; however, the acidic nature of such a compound may militate against use on industrial levels). Without intending on being bound to any specific scientific theory, it is believed that copper sulfate enables doping of copper [as a copper (II) species] in some form to the silicon-based gel structure, while the transferred copper species maintains its ability to complex with ammonium ions, and further permits color change within the filter medium upon exposure to sufficient amounts of ammonia gas to facilitate identification of effectiveness of gas removal and eventual saturation of the filter medium. In such a manner, it is an easy task to view the resultant filtration system empirically to determine if and when the filter medium has been saturated and thus requires replacement.

The wet state doping procedure has proven to be particularly useful for the provision of certain desired filter efficiency results, as noted above. A dry mixing of the metal salt and silicon-based gel does not accord the same degree of impregnation within the gel pores necessary for ammonia capture and retention. Without such a wet reaction, although capture may be accomplished, the ability to retain the trapped ammonia (in this situation, the ammonia may actually be modified upon capture or within the subject environment to ammonium hydroxide as well as a portion remain as ammonia gas) can be reduced. It is believed, without intending on being limited to such a theory, that in such a product, ammonia capture is still effectuated by metal complexation, but the lack of small pore volumes with metal incorporated therein limits the ability for the metal to complex strongly enough to prevent release upon certain environmental changes (such as, as one example, high temperature exposure). Such a result is actually the object of the closest prior art. As in the noted Kemira reference above, a dry mix procedure produces a regenerable filter medium rather than a permanent capture and retention filter medium. The particular wet reaction is discussed more specifically within the examples below, but, in its broadest sense, the reaction entails the reaction of a silicon-based gel with introduced water present in an amount of at least 50% by weight of the gel and metal salt materials. Preferably, the amount of water is higher, such as at least 70%; more preferably at least 80%, and most preferably at least 85%. If the reaction is too dry, proper metal doping will not occur as the added water is necessary to transport the metal salts into the pores of the gel materials. Without sufficient amounts of metal within such pores, the gas removal capabilities of the filter medium made therefrom will be reduced. The term "added" or "introduced" water is intended to include various forms of water, such as, without limitation, water present within a solution of the metal salt or the gel, hydrated forms of metal salts, hydrated forms of residual gel reactant salts, such as sodium sulfate, moisture, and relative humidity; basically any form that is not present as an integral part of the either the gel or metal salt itself, or that is not transferred into the pores of the material after doping has occurred. Thus, as non-limiting examples, again, the production of gel material, followed by drying initially with a subsequent wetting step (for instance, slurrying within an aqueous solution, as one non-limiting example), followed by the reaction with the multivalent metal salt, may be employed for this purpose, as well as the potentially preferred method of retaining the gel material in a wet state with subsequent multivalent metal salt reaction thereafter.

Water is also important, however, to aid in the complexation of the metal with the subject noxious gas within the gel pores. It is believed, without intending on being bound to any specific scientific theory, that upon doping the metal salt is actually retained but complexed, via the metal cation, to the silicon-based gel within the pores thereof (and some may actual complex on the gel surface but will more readily become de-complexed and thus removed over time; within the pores, the complex with the metal is relatively strong and thus difficult to break). The presence of water at that point aids in removing the anionic portion of the complexed salt molecule through displacement thereof with hydrates. It is believed that these hydrates can then be displaced themselves by, as one example, the ammonia gas (or ammonium ions) thereby producing an overall gel/metal/ammonium complex that is strongly associated and very difficult to break, ultimately providing not only an effective ammonia gas capture mechanism, but also a manner of retaining such ammonia gases substantially irreversibly. The water utilized as such a complexation aid can be residual water from the metal doping step above, or present as a hydrated form on either the gel surface (or within the gel pores) or from the metal salt reactant itself. Furthermore, and in one potentially preferred embodiment, such water may be provided through the presence of humectants (such as glycerol, as one non-limiting example).

The inventive silicon-based gel particles thus have been doped (impregnated) with at least one multivalent metal salt (such as, as one non-limiting example, copper sulfate) in an amount of from about 2 to about 30 wt %, expressed as the percentage weight of base metals, such as copper, of the entire dry weight of the metal-impregnated (doped) silicon gel-based particles. Such resultant metal-doped silicon-based gel materials thus provide a filter medium that exhibits a breakthrough time for an ammonia gas/air composition having a 1000 mg/m$^3$ ammonia gas concentration when exposed to ambient pressure (i.e., from 0.8 to 1.2 atmospheres, or roughly from 0.81 to 1.25 kPa) and temperature (i.e., from 20-25° C.) of at least 35 mg/m$^3$ when applied to a filter bed of at most 2 cm height within a flask of 4.1 cm in diameter, and wherein said ammonia gas captured by said filter medium does not exhibit any appreciable regeneration upon exposure to a temperature up to 250° C. at ambient pressure for 70 hours.

The hydrous silicon-based gels are employed in the filter medium of this invention in an amount from about 1 to about 90 percent, preferably about 5 to about 70 percent, by weight of the entire filter medium composition.

The filter medium of the invention can also further contain as optional ingredients, silicates, clays, talcs, aluminas, carbons, polymers, including but not limited to polysaccharides, gums or other substances used as binder fillers. These are conventional components of filter media, and materials suitable for this purpose need not be enumerated for they are well known to those skilled in the art. Furthermore, such metal-doped silicon-based gels of the invention may also be introduced within a polymer composition (through impregnation, or through extrusion) to provide a polymeric film, composite, or other type of polymeric solid for utilization as a filter medium. Additionally, a nonwoven fabric may be impregnated, coated, or otherwise treated with such invention materials, or individual yarns or filaments may be extruded with such materials and formed into a nonwoven, woven, or knit web, all to provide a filter medium base as well. Additionally, the inventive filter media may be layered within a filter canister with other types of filter media present therewith (such as layers of carbon black material), or, alternatively, the filter media may be interspersed together within the same canister. Such films and/or fabrics, as noted above, may include discrete areas of filter medium, or the same type of interspersed materials (carbon black mixed on the surface, or co-extruded, as merely examples, within the same fabric or film) as well.

The filter system utilized for testing of the viability of the medium typically contains a media bed thickness of from about 1 cm to about 3 cm thickness, preferably about 1 cm to about 2 cm thickness within a flask of 4.1 cm in diameter. Without limitation, typical filters that may actually include such a filter medium, for example, for industrial and/or personal use, will comprise greater thicknesses (and thus amounts) of such a filter medium, from about 1-15 cm in thickness and approximately 10 cm in diameter, for example for personal canister filter types, up to 100 cm in thickness and 50 cm in diameter, at least, for industrial uses. Again, these are only intended to be rough approximations for such end use applications; any thickness, diameter, width, height, etc., of the bed and/or the container may be utilized in actuality, depending on the length of time the filter may be in use and the potential for gaseous contamination the target environment may exhibit. The amount of filter medium that may be introduced within a filter system in any amount, as long as the container is structurally sufficient to hold the filter medium therein and permits proper airflow in order for the filter medium to properly contact the target gases.

It is important to note that although ammonia gas is the test subject for removal by the inventive filter media discussed herein, such media may also be effective in removing other noxious gases from certain environments as well, including formaldehyde, nitrous oxide, and carbon disulfide, as merely examples.

As previously mentioned, the filter medium can be used in filtration applications in an industrial setting (such as protecting entire industrial buildings or individual workers, via masks), a military setting (such as filters for vehicles or buildings or masks for individual troops), commercial/public settings (office buildings, shopping centers, museums, governmental locations and installations, and the like). Specific examples may include, without limitation, the protection of workers in agricultural environments, such as within poultry houses, as one example, where vast quantities of ammonia gas can be generated by animal waste. Thus, large-scale filters may be utilized in such locations, or individuals may utilize personal filter apparatuses for such purposes. Furthermore, such filters may be utilized at or around transformers that may generate certain noxious gases. Generally, such inventive filter media may be included in any type of filter system that is necessary and useful for the removal of potential noxious gases in any type of environment.

BRIEF DESCRIPTION OF THE DRAWINGS

Certain graphical representations accompany the text description of this invention. Nothing therein should be considered as limiting the scope of the invention.

PREFERRED EMBODIMENTS OF THE INVENTION

Figure 1:
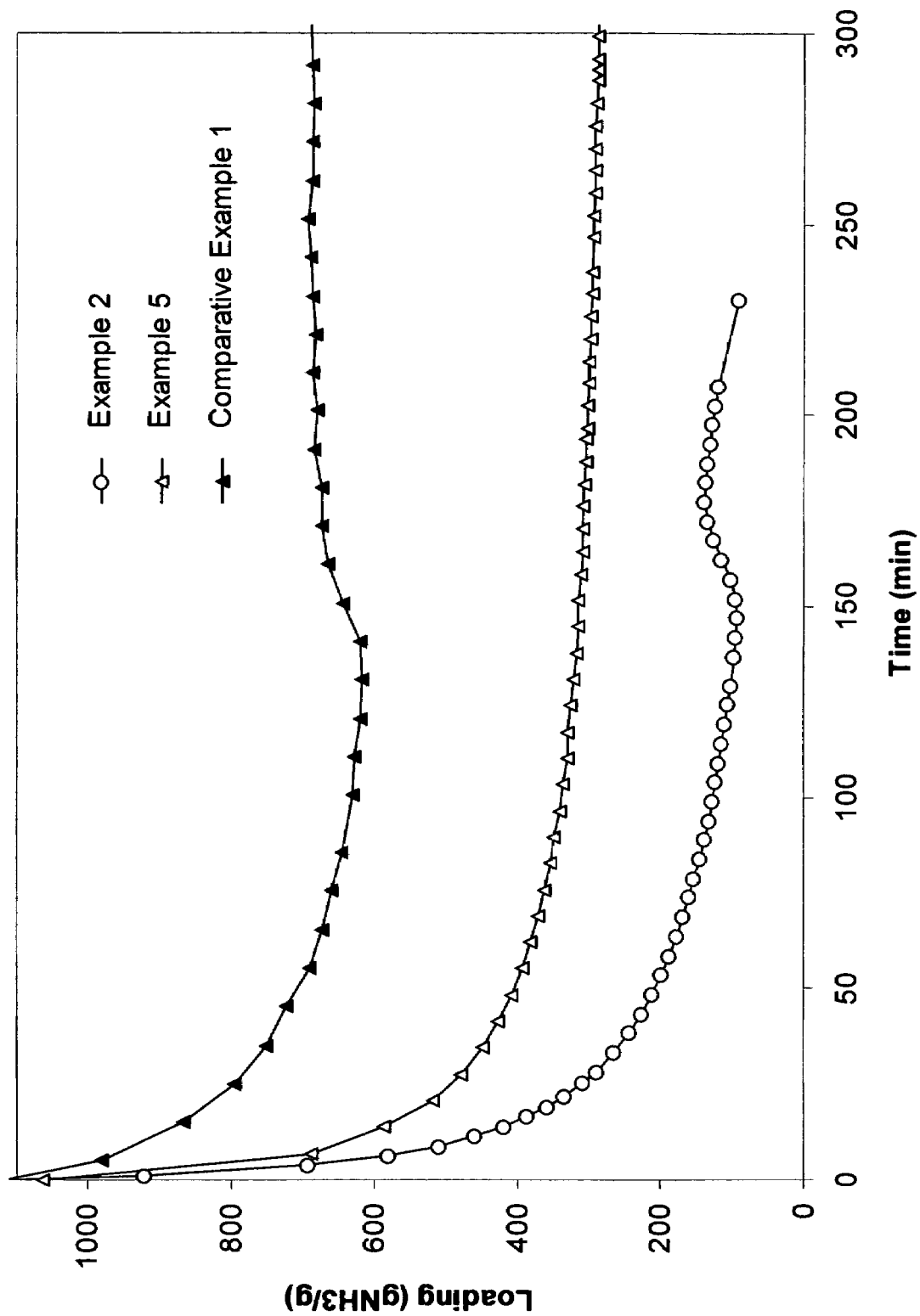
FIG. 1 is a graphical representation relating to the information provided within TABLE 6, below, in terms of the concentration of ammonia uptake by the subject inventive and comparative filter media materials over time.

Copper content was determined utilizing an ICP-OES model Optima 3000 available from PerkinElmer Corporation, Shelton, Conn.

The % solids of the adsorbent wet cake were determined by placing a representative 2 g sample on the pan of a CEM 910700 microwave balance and drying the sample to constant weight. The weight difference is used to calculate the % solids content. Pack or tapped density is determined by weighing 100.0 grams of product into a 250-mL plastic graduated cylinder with a flat bottom. The cylinder is closed with a rubber stopper, placed on the tap density machine and run for 15 minutes. The tap density machine is a conventional motor-gear reducer drive operating a cam at 60 rpm. The cam is cut or designed to raise and drop the cylinder a distance of 2.25 in. (5.715 cm) every second. The cylinder is held in position by guide brackets. The volume occupied by the product after tapping was recorded and pack density was calculated and expressed in g/ml.

The conductivity of the filtrate was determined utilizing an Orion Model 140 Conductivity Meter with temperature compensator by immersing the electrode epoxy conductivity cell (014010) in the recovered filtrate or filtrate stream. Measurements are typically made at a temperature of 15-20° C.

Surface area is determined by the BET nitrogen adsorption methods of Brunaur et al., *J. Am. Chem. Soc.,* 60, 309 (1938).

Accessible porosity has been obtained using nitrogen adsorption-desorption isotherm measurements. The BJH (Barrett-Joiner-Halender) model average pore diameter was determined based on the desorption branch utilizing an Accelerated Surface Area and Porosimetry System (ASAP 2010) available from Micromeritics Instrument Corporation, Norcross, Ga. Samples were out gassed at 150-200° C. until the vacuum pressure was about 5 μm of Mercury. This is an automated volumetric analyzer at 77° K. Pore volume is obtained at pressure $P/P_0=0.99$. Average pore diameter is derived from pore volume and surface area assuming cylindrical pores. Pore size distribution ($\Delta V/\Delta D$) is calculated using BJH method, which gives the pore volume within a range of pore diameters. A Halsey thickness curve type was used with pore size range of 1.7 to 300.0 nm diameter, with zero fraction of pores open at both ends.

The $N_2$ adsorption and desorption isotherms were classified according to the 1985 IUPAC classification for general isotherm types including classification of hysteresis to describe the shape and inter connectedness of pores present in the silicon based gel.

Adsorbent micropore area ($S_{micro}$) is derived from the Halsey isotherm equation used in producing a t-plot. The t-plot compares a graph of the volume of nitrogen absorbed by the adsorbent gel as compared with the thickness of the adsorbent layer to an ideal reference. The shape of the t-plot can be used to estimate the micropore surface area. Percent microporosity is then estimated by subtracting the external surface area from the total BET surface area, where $S_{micro}=S_{BET}-S_{ext}$. Thus % BJH microporosity=$S_{micro}/S_{BET}\times 100$.

The level of metal impregnate is expressed on a % elemental basis. A sample impregnated with about 5 wt % of copper exhibits a level of copper chloride so that the percent Cu added to the silicon-based gel is about 5 wt % of Cu/adsorbent Wt. In the case of cupric chloride dihydrate, then ($CuCl_2.2H_2O$), 100 g of dry adsorbent would be impregnated with dry 113.65 g of cupric chloride. Thus, the calculation is basically made as % Metal=Weight of elemental metal in metal salt/(weight of dry silicon-based gel+ weight of total dry metal salt).

EXAMPLES 1-4

In examples 1-4, particles of silicic acid gel were produced by adding a solution of 24.7% sodium silicate (3.3 mole ratio) to a specified volume of 11.4% sulfuric acid solution and until the pH of the solution reached the target pH. Silicic acid gel suspension formed and was aged for 3 to 4 hours at ambient temperature. The suspension was then placed into an oven set at 75° C. for the specified time to complete gel formation. Next, the gel was broken apart by stirring and scraping with a spatula and then filtered and washed with water to a filtrate conductivity of about less than 3000 μS. The dewatered gel was dried in an oven at the specified temperature for 16 hours. The dry material was sieved on a stack of 2 U.S. Standard Mesh screens size 20 mesh and 40 mesh to recover silicic acid adsorbent base particles sized between 850 μm and 425 μm. Processing parameters for Examples 1-3 are summarized below in Table 1.

TABLE 1

| Example | $H_2SO_4$ Ml | Target pH | Gel Formation Time, hr | Drying Temperature ° C. | % Solids |
|---|---|---|---|---|---|
| 1 (Control) | 1000 | 1.75 | 1.5 | 75 | 15 |
| 2 | 1000 | 1.75 | 1.5 | 105 | 15 |
| 3 | 5000 | 1.75 | 1.5 | 105 | 18.7 |
| 4 | 5000 | 1.60 | 3.0 | 105 | 18.7 |

Example 1 was not treated with copper (and thus is a control). Examples 2, 3 and 4 were then impregnated with copper by first forming a cupric chloride solution by mixing the specified amount of $CuCl_2.2H_2O$ with the specified amount of water and then adding the specified amount of dewatered silica formed above to the cupric chloride solution. (The % solids of the dried gel determined according to the method described above, was used to estimate the quantity of impregnate required to obtain the desired metal impregnate level.) The pH of the resulting suspension was adjusted to a target pH with HCl or 50% aqueous NaOH solution, as indicated. The slurry was then agitated at ambient temperature for the time specified and then recovered by filtration. To form granules and increase particle density, 200 g of the prepared particles were added to a CUISINART® model DFP14BW Type 33 high shear mixer/agitator. To the continuously mixed adsorbent particles, water, as a binder liquid, was added at a rate of approximately 10 ml/min continuously until fine granules are formed. The crude wet granules obtained were 200-1600 μm in size. The recovered wet granules were dried overnight (16 hr) at the specified temperature. The dried product was then sized by sieving as described above to recover particles sized between 850 μm and 425 μm. The target particle granules obtained in this manner have a bulk density of approximately 0.7 g/ml. Process variables for copper impregnation are summarized in Table 2.

TABLE 2

| Ex. # | CuCl$_2$.2H$_2$O g | Water ml | Substrate g | pH Adjuster | Target pH | Agit. Time, Hr | Drying Temp. °C. |
|---|---|---|---|---|---|---|---|
| 1 | 0 | — | — | — | — | — | 105 |
| 2 | 50 | 700 | 200 | HCl | 1.8 | 48 | 105 |
| 3 | 190 | 500 | 2000 | NaOH | 2.0 | 16 | 105 |
| 4 | 200 | 0 | 1000 | — | 1.6 | 16 | 105 |

Physical properties of Example 1-4 were determined according to the methods described above and results are given in TABLE 5 below.

EXAMPLE 5

A portion of the product of Example 1 was impregnated with copper by a reflux technique by adding 250 g isopropyl alcohol (IPA) to an extraction flask along with 200 g of dewatered gel from Example 1. To this slurry was added 50 g of cupric chloride and the mixture was refluxed for 3 hours at 80° C. The copper-treated polysilicic acid adsorbent was separated from the IPA by decanting the supernatant and the recovered solids were dried in an oven at 105° C. for 16 hours. Example 4 particles were granulated by adding 200 g of the prepared particles to a CUISINART® model DFP14BW Type 33 high shear mixer/agitator. To the continuously mixed adsorbent particles, water, as a binder liquid, was added at a rate of approximately 10 ml/min continuously until fine granules are formed. The crude wet granules obtained were 200-1600 μm in size. The recovered wet granules were dried overnight (16 hr) at the 105° C. The dried particles were then sized by sieving as described above to recover particles sized between 850 μm and 425 μm. The Example 5 adsorbent contains 15.2% Cu in the form of copper chloride.

EXAMPLES 6-12

In examples 6-12, particles of silicon-based gel were produced by adding a solution of 24.7% sodium silicate (3.3 mole ratio) solution to 5000 ml of 11.4% sulfuric acid solution with agitation at 300-400 rpm until the pH of the solution reached the target pH. The suspension was then placed into an oven set at 75° C. for the specified time to complete gel formation. Next, the gel was broken apart by stirring and scraping with a spatula and then washed with water by pumping water into the bottom of the reactor and allowing the water to overflow out the top to an overflow conductivity of less than 3000 μS. The washed particles are then filtered and collected to be used as the base material for copper impregnation described below. Examples 6 and 12 were categorized as polysilicic acid types gels, and the remainder were categorized as silica gels. Processing parameters for Examples 6-12 are summarized below in Table 3.

TABLE 3

| Example | Target pH | Gel Formation Time, Hr | % Solids |
|---|---|---|---|
| 6 | 1.75 | 3-4 | 15 |
| 7 | 4.0 | 0.25 | 15 |
| 8 | 3.0 | 1.5 | 15 |
| 9 | 3.0 | 1.5 | 15 |

TABLE 3-continued

| Example | Target pH | Gel Formation Time, Hr | % Solids |
|---|---|---|---|
| 10 | 3.0 | 1.5 | 15 |
| 11 | 3.0 | 1.5 | 15 |
| 12 | 1.6 | 34 | 18.7 |

Examples 6-12 were then impregnated with copper by adding to a specified amount of gel wet cake formed above a copper sulfate solution formed by mixing the specified amount of CuSO$_4$.5H$_2$O with the specified amount of water. (The % solids of the dried gel, determined according to the method described above, was used to estimate the quantity of impregnate required to achieve the desired metal level.) The slurry was then agitated at the specified speed for the time specified at ambient temperature and then dewatered by filtration (Examples 6-7) or placed directly in an oven set at 105° C. without filtration (Examples 8-12) and dried overnight (16 hours).

To form granules and increase product density, 1 kg of the dried particles prepared above and having a bulk density of about 0.50 g/ml were compacted in a roller compactor (model WP50N/75 available from Alexanderwerks GmbH, Germany) using a pressing force of 200-500 kP (60-70 bar) to form crayon-shaped agglomerates, which were then comminuted in a grinding process, pre-grinding using toothed-disk rollers (Alexanderwerks). The crude granules obtained were approximately 0.7 kg of 400-1600 μm sized granules. The granules were then sized by sieving as described above to recover granules sized between 850 μm and 425 μm. The target particle granules obtained in this manner have a bulk density of approximately 0.7 g/cc. Process variables for copper impregnation are summarized in Table 4.

TABLE 4

| Example | CuSO$_4$.5H$_2$O, g | Water g | Substrate (wet gel) G | Agitation Speed RPM | Agitation time, Hr |
|---|---|---|---|---|---|
| 6 | 119 | 750 | 1380 | 200 | 16 |
| 7 | 119 | 50 | 1380 | 300 | 16 |
| 8 | 208 | 300 | 1000 | 450 | 16 |
| 9 | 225 | 50 | 1000 | 600 | 16 |
| 10 | 3080 | 4000 | 13700 | 9000 | 10 |
| 11 | 385 | 0 | 1000 | 450 | 16 |
| 12 | 120 | 750 | 1000 | 600 | 7 |

Physical properties of Example 6-12 were determined according to the methods described above and results are summarized in Table 5 below.

EXAMPLE 13

Particles of silicic acid were produced by placing 1000 ml of 11.4% sulfuric acid solution in a reaction vessel and adding a solution of 24.7% sodium silicate solution (3.3 mole SiO$_2$:Na$_2$O) with mixing at 400 rpm until the pH of the mixture reaches 1.75. The silicic acid suspension was placed into an oven at 75° C. for 3 hours in order to complete gel formation. Next, the gel was broken apart by stirring and scraping with a spatula and then filtered and washed with water to a filtrate conductivity of less than 300 μS. The formed gel was dewatered by filtration and the resulting wet cake was collected. To 250 g wet cake was added 700 ml of water containing 50 g cupric nitrate, Cu(NO$_3$)$_2$.3H$_2$O. The mixture was agitated to form homogenous slurry and the pH adjusted to 1.0 with concentrated nitric acid. The slurry was agitated at 300 rpm for 6 hours and at ambient conditions, then filtered and dried in an oven set at 105° C. for 16 hr. The particles were granulated and sieved as described above in Examples 1-3 to recover particles sized between 850 μm and 425 μm. Physical properties of Example 13 were determined according to the methods described above and results are given in Table 5 below.

EXAMPLE 14

Particles of silicic acid were produced according to methods used for Examples 8-11 described previously. The formed gel was dewatered by filtration and the resulting wet cake was collected. To 2100 g wet cake was added 600 ml of water containing 300 g cupric nitrate, Cu(NO$_3$)$_2$.3H$_2$O. The mixture was agitated to form homogenous slurry at 6000 rpm for 20 minutes and at ambient conditions, then filtered and dried in an oven set at 105° C. for 16 hr. To form granules and increase product density, 1 kg of the dried particles prepared above and having a bulk density of about 0.50 g/ml were compacted in a roller compactor (model WP50N/75 available from Alexanderwerks GmbH, Germany) using a pressing force of 200-500 kP (60-70 bar) to form crayon-shaped agglomerates, which were then comminuted in a grinding process, pre-grinding using toothed-disk rollers (Alexanderwerks). The crude granules obtained were approximately 0.7 kg of 400-1600 μm sized granules. The granules were then sized by sieving as described above to recover granules sized between 850 μm and 425 μm. The target particle granules obtained in this manner have a bulk density of approximately 0.7 g/cc. Physical properties of Example 14 were determined according to the methods described above and results are given in Table 5 below.

EXAMPLE 15

Particles of the commercial silica gel of Comparative Example 1 were impregnated with copper by adding to 200 g of Comparative Example 1 particles a copper sulfate solution formed by mixing 100 g CuSO$_4$.5H$_2$O with 400 g of water. The pH of the resulting slurry was adjusted to 1.0 with HCl and then agitated at 5000 rpm for 16 hours at ambient temperature and then the particles were recovered by filtration and placed in an oven set at 105° C. and dried overnight (16 hr). The resultant copper impregnated particles were sized by sieving as described above to recover particles sized between 850 μm and 425 μm. Example 15 contained 3.8% Cu. Physical properties of Example 15 were determined according to the methods described above and results are given in Table 5 below.

EXAMPLE 16

Particles of the commercial silica gel of Comparative Example 1 were impregnated with copper by combining 266 g of Comparative Example 1 particles with 400 g CuSO4.5H2O and co-milling the mixture to achieve a size 100% less than 100 mesh. To this fine particle size mixture was added 750 g of water. The resulting slurry was then agitated at 6000 rpm for 20 minutes at ambient temperature and then the particles were placed in an oven set at 105° C. and dried overnight (16 hr). The resultant copper impregnated particles were roller compacted as described above to recover particles sized between 850 μm and 425 μm. Example 15 contained 15% Cu. Physical properties of Example 16 were determined according to the methods described above and results are given in Table 5 below.

EXAMPLE 17

Particles of the commercial silica obtained from International Silica Technologies, LLC, Woodlands, Tex. were impregnated with copper by adding to 150 g of said silica to a copper sulfate solution formed by mixing 220 g CuSO$_4$.5H$_2$O with 400 g of water. The resulting slurry was then agitated at 6000 rpm for 1 hour at ambient temperature and placed in an oven set at 105° C. and dried overnight (16 hr). The resultant copper treated particles were deagglomerated and roller compacted at 50 bar before being sized by sieving as described above to recover particles sized between 850 μm and 425 μm. Example 17 contained 15% Cu.

COMPARATIVE EXAMPLE 1

Particles of commercially available Silica Gel 408 Type RD desiccant grade silica gel available from W.R. Grace & Company, Columbia, Md., were sized by sieving as previously described above to recover particles sized between 850 μm and 425 μm (in essence a second control example).

COMPARATIVE EXAMPLE 2

Particles of silica gel were produced by placing 2000 g of 24.7% sodium silicate solution (3.3 mole SiO$_2$:Na$_2$O) in an agitated reaction vessel and adding with mixing (400 rpm) 2000 g deionized water. To this mixture was added 11.4% sulfuric acid solution at 35 ml/min until the pH of the mixture reached 10.8. The mixture was cooled to 4° C. by surrounding the reaction vessel with ice and aged at for 24 hours to complete gel formation. After aging, the mixture was slurried by adding 2000 ml water and the slurry pH was reduced to 3.0 with additional $H_2SO_4$. The particles were recovered by filtration and washed with water to a filtrate conductivity of less than 1000 µS. The resulting particles were dried in an oven set at 105° C. for 16 hours.

To impregnate the particles with calcium chloride, 100 g silica gel particles were added to 300 ml of water containing 70 g $CaCl_2.2H_2O$. Immediately, 3 ml of concentrated HCL was added to reduce the slurry pH to below 1.0. The slurry was agitated at 300 rpm for 5 hours at ambient conditions to form homogenous slurry. The slurry was filtered to recover the particles, which were then dried for 16 hours in an oven set at 105° C.

To form granules, 100 g of the dried particles and 2 g of Starch 1500 available from Colorcon, West Point, Pa., were vigorously agitated in a CUISINART® Model DFP14BW Type 33 high shear mixer and water was added until small granules formed. The formed granules were then dried for 16 hours in an oven set at 70° C. The dried granules were then sized by sieving as described above to recover particles sized between 850 µm and 425 µm. Comparative Example 2 contained 19% calcium in the form of calcium chloride. Comparative Example 2 was used to contrast the performance of calcium chloride impregnate versus copper chloride impregnate.

COMPARATIVE EXAMPLE 3

Particles of the commercial silica gel of Comparative Example 1 were mixed with copper by dry mixing together 200 g of Comparative Example 1 particles and 450 g of dry milled copper sulfate, $CuSO_4.5H_2O$ (no water was introduced other than that present in hydrated form and as provided by humidity of the reactor). The dry physical blend was sized by sieving as described above to recover particles sized between 850 µm and 425 µm. Comparative Example 3 contained 15% Cu.

COMPARATIVE EXAMPLE 4

Particles of commercially available ASZM-TEDA Impregnated carbon particles available from Calgon Corporation, Pittsburgh, Pa., were sized by sieving as described above to recover granules sized between 850 µm and 425 µm.

Physical properties of Comparative Examples 1-4 were determined according to the methods described above and results are given in Table 5 below along with the properties for Examples 1-17.

TABLE 5

| Ex. # | % Cu | Packed Density, g/ml | BET Surface Area $m^2/g$ | % BJH Mic. Porosity | $N_2$ Adsorp./Desorp. Isotherm Hysteresis, IUPAC Type | BJH Desorp. Total Pore Vol. (cc/g) | BJH Desorp. Pore Vol. 20-40 Å (cc/g) | BJH Desorp. Pore Area 20-40 Å $(m^2/g)$ | BJH Med. Pore Diam. (') |
|---|---|---|---|---|---|---|---|---|---|
| 1 | 0 | 0.91 | 586 | 59.5 | IV-$H_2$ | 0.226 | 0.136 | 233 | 27 |
| 2 | 8.07 | 0.96 | 509 | 43.9 | IV-$H_2$ | 0.0263 | 0.247 | 362 | 25 |
| 3 | 17.5 | 0.85 | 248 | 81 | I | 0.073 | 0.0650 | 108 | 28 |
| 4 | 23.2 | 1.12 | 205 | 53 | IV-$H_2$ | 0.105 | 0.087 | 134 | 31 |
| 5 | 15.2 | 0.84 | 371 | — | IV-$H_4$ | 0.288 | 0.164 | 250 | 34 |
| 6 | 7.4 | 0.96 | 284 | 82 | IV-$H_4$ | 0.115 | 0.075 | 124 | 38 |
| 7 | 8.9 | 0.73 | 407 | 40 | IV-$H_4$ | 0.247 | 0.165 | 249 | 33 |
| 8 | 13.5 | 0.57 | 257 | 8.6 | IV-$H_2$ | 0.456 | 0.058 | 80 | 56 |
| 9 | 15.3 | 0.73 | 217 | 14.3 | IV-$H_4$ | 0.28 | 0.118 | 157 | 42 |
| 10 | 16.0 | 0.70 | 197 | 11.6 | IV-$H_2$ | 0.29 | 0.069 | 93 | 48 |
| 11 | 19.0 | 0.80 | 258 | 6.4 | IV-$H_3$ | 0.28 | 0.040 | 53 | 62 |
| 12 | 25.2 | 0.85 | 267 | 84 | IV-$H_4$ | 0.07 | 0.0162 | 105 | 28 |
| 13 | 5.0 | — | 489 | 19 | IV-$H_4$ | 0.314 | 0.287 | 408 | 28 |
| 14 | 15 | 1.08 | 58 | 10 | IV-$H_4$ | 0.070 | 0.035 | 51 | 40 |
| 15 | 15 | — | 238 | 25 | II-$H_4$ | 0.165 | 0.122 | 176 | 35 |
| 16 | 15 | 0.87 | 258 | 31 | IV-$H_4$ | 0.171 | 0.123 | 178 | 34 |
| 17 | 15 | 0.87 | 124 | 12 | IV-$H_2$ | 0.207 | 0.025 | 20 | 50 |
| Comp Ex. 1 | 0 | 0.73 | 755 | 71 | IV-$H_2$ | 0.24 | 0.231 | 374 | 27 |
| Comp. Ex. 2 | 0 | — | 281 | — | IV-$H_2$ | 0.48 | 0.094 | 66 | 66 |
| Comp Ex. 3 | 15 | 0.77 | 361 | — | IV-$H_4$ | 0.163 | 0.092 | 184 | 33 |
| Comp. Ex. 4 | na | 0.60 | 790 | 89 | I-$H_4$ | 0.159 | 0.077 | 133 | 35 |

Ammonia Uptake

Several of the examples prepared above were evaluated for their capacity to absorb ammonia from air, both in terms of uptake and breakthrough. As noted above, uptake measurements provide evidence of the effectiveness of the adsorbent filter medium to remove and capture noxious gases, in this situation, as a test subject, ammonia gas, from within the test system in a certain period of time. Breakthrough measures the amount of time such a filter medium becomes saturated. Screening of filter media for such uptake properties was undertaken in order to provide an initial assessment of the potential for effective breakthrough characteristics.

For the ammonia uptake tests, the following protocol was followed, basically in accordance with that set forth within Mahle, J., Buettner, L. and Friday, D. K., "Measurement and Correlation of the Adsorption Equilibria of Refrigerant Vapors on Activated Carbon," *Ind. Eng. Chem. Res.,* 33, 346-354 (1994). The silicon-based gel adsorbent samples were loaded into a 15 µm frit-bottomed metal cell that allows airflow of a constant volume to be recycled through the cell in a closed loop system. The bed height of the filter medium was recorded after adding 100 mg of adsorbent (filter medium). The system is typically dry but the relative humidity of the system may be adjusted (Humid) by injecting a known quantity of water into the system to increase the relative humidity. The target ammonia concentration was 1100 mg/m$^3$ in the closed loop system, which was equilibrated at 25° C. and the actual concentration of ammonia in the airstream was monitored using an infrared analyzer (MIRAN, Foxboro Company, Foxboro, Mass.). Ammonia was injected into the system through a septum located at the inlet (low pressure side) of the circulating pump.

The batch uptake test started with the adsorbent bed in the bypass mode. Ammonia was injected into the system and allowed to equilibrate. The mass of ammonia injected was determined by the volume of the gas-tight syringe. The infrared analysis was initially a redundant determination of the NH$_3$ mass injected. After the ammonia concentration stabilized, the bed bypass valve was changed to send the ammonia-contaminated air over the adsorbent (filter medium). The infrared analyzer then measured the gas-phase concentration change as a function of time.

A decrease in concentration was an indication of ammonia removal from the air stream by the adsorbent. Precisely known weights of the subject gases allowed ammonia uptake to be measured, as well. The system temperature was maintained at 75° C. or increased from 25 to 75° C. when it reached equilibrium to determine if the ammonia captured up to that time was on the surface of the gel materials or within the pores (an increase in the concentration measurement within the headspace of the system indicated a release of ammonia from the filter medium). A release of ammonia from the gel materials noticed upon such a temperature increase was an indication that the capture of such gas occurred at the gel material surface since any captured within the pores by the metal complex would not be readily released from such a relatively low temperature increase.

Tests were performed at dry and humid conditions to show the enhanced performance of the inventive silicon-based gel adsorbents of this invention.

A reduction in ammonia concentration to less than 200 mg/m$^3$ at 25° C. was targeted to show effectiveness in ammonia removal.

TABLE 6

Ammonia Uptake

| | | | Temp. Change | |
|---|---|---|---|---|
| Example No | Initial Conc., mg NH$_3$/m$^3$ | Conc., mg NH$_3$/m$^3$ | Time, min. | Temp., ° C. | Conc, mg NH$_3$/m$^3$ |
| Comparative Example 1 | 1000 | 614 | 135 | 75 | 694 |
| Example 2 | 1000 | 97 | 135 | 75 | 67 |
| Example 5 | 1000 | 1000 | 0 | 75 | 140 |

Since the uptake system is volumetric the amount of chemical in the vapor is inversely proportional to amount of chemical adsorbed and/or reacted on the adsorbent. FIG. 1 and Table 6 summarize batch uptake profiles for three adsorbents, two impregnated (inventive) and one unimpregnated (comparative). The plot shows the effect of temperature on uptake, as well as the initial uptake rate of ammonia for each adsorbent. These data reveal whether a given adsorbent has an internal mass transfer rate that is fast enough to be useful in a filter at reasonable gas throughput velocities. That is, even though a given adsorbent may remove a large amount of ammonia, if it takes a long time to reach equilibrium that adsorbent will likely not be useful in an end-use filter for certain applications. As it is, the tested Examples all gave good indications of effective potential breakthrough characteristics.

The plot further shows the effect of temperature on the adsorption behavior of ammonia for each sample. These data clearly show the presence of chemical reaction. Considering the data for Comparative Example 1, at about 135 minutes exposure, when the sample reached equilibrium, the temperature of the adsorbent was changed to 75° C. With such a modification, the ammonia vapor phase concentration increases from about 614 mg/m$^3$ to about 694 mg/m$^3$ indicating, via adsorption equilibrium, that less ammonia will adsorb as the temperature increases. After about 180 minutes the ammonia concentration stabilizes and no noticeable change is observed over at least the next hour. This is a perfect example of what one expects to see for reversible adsorption equilibria. The two impregnated samples on the other hand do not show the classic adsorption equilibria behavior at 75° C. For Example 2, when the temperature is raised to 75° C. at about 135 minutes, when the sample reached equilibrium, the ammonia concentration rises due to some adsorbed ammonia being displaced from the surface; however, the maximum concentration increase was achieved after about 180 minutes is only about ½ of the concentration increase observed for Comparative Example 1. That means that even though there is more ammonia associated with the adsorbent, less ammonia is being displaced during the temperature change. In addition, starting at about 180 minutes the concentration begins to decrease slowly, indicating existence of a chemical reaction. For Example 5 the irreversibility is even more dramatic. For this experiment the temperature was set at 75° C. for the entire run. There is no evidence of any increase in ammonia concentration which implies that there must be very little, if any, reversibly adsorbed ammonia. At the higher temperature the ammonia concentration continually declined at an easily observed rate to about 300 mg/m$^3$ where it leveled off, again indicating that the adsorbent is highly reactive and, as with the other inventive Example, shows excellent ammonia uptake.

Ammonia Breakthrough

The general protocol utilized for breakthrough measurements involved the use of two parallel flow systems having two distinct valves leading to two distinct adsorbent beds (including the filter medium), connected to two different infrared detectors followed by two mass flow controllers. The overall system basically permitting mixing of ammonia and air within the same pipeline for transfer to either adsorbent bed or continuing through to the same gas chromatograph. In such a manner, the uptake of the filter media within the two adsorbent beds was compared for ammonia concentration after a certain period of time through the analysis via the gas chromatograph as compared with the non-filtered ammonia/air mixture produced simultaneously. A vacuum was utilized at the end of the system to force the ammonia/air mixture through the two parallel flow systems as well as the non-filtered pipeline with the flow controlled using 0-50 SLPM mass flow controllers.

To generate the ammonia/air mixture, two mass flow controllers generated challenge concentration of ammonia, one being a challenge air mass flow controller having a 0-100 SLPM range and the other being an ammonia mass flow controller having a 0-100 sccm range. A third air flow controller was used to control the flow through a heated water sparger to control the challenge air relative humidity (RH). Two dew point analyzers, one located in the challenge air line above the beds and the other measuring the effluent RH coming out of one of the two filter beds, were utilized to determine the RH thereof (modified for different levels).

The beds were 4.1 cm glass tubes with a baffled screen to hold the adsorbent. The adsorbent was introduced into the glass tube using a fill tower to obtain the best and most uniform packing each time.

The challenge chemical concentration was then measured using an HP 5890 gas chromatograph with a Thermal Conductivity Detector (TCD). The effluent concentration of ammonia was measured using an infrared analyzer (MI-RAN), previously calibrated at a specific wavelength for ammonia.

The adsorbent was prepared for testing by screening all of the particles below 40 mesh (~425 microns). The largest particles were typically no larger than about 25 mesh (~710 microns).

The valves above the two beds were initially closed. The diluent air flow and the water sparger air flow were started and the system was allowed to equilibrate at the desired temperature and relative humidity (RH). The valves above the beds were then changed and simultaneously the chemical flow was started and kept at a rate of 4.75 SLPM. The chemical flow was set to achieve the desired challenge chemical concentration. The feed chemical concentration was constantly monitored using the GC. The effluent concentrations from the two adsorbent beds (filter media) were measured continuously using the previously calibrated infrared detectors. The breakthrough time was defined as the time when the effluent chemical concentration equaled the target breakthrough concentration. For ammonia tests, the challenge concentration was 1,000 mg/m$^3$ at 25° C. and the breakthrough concentration was 35 mg/m$^3$ at 25° C.

Ammonia breakthrough was then measured for distinct filter medium samples, with the bed depth of such samples modified as noted, the relative humidity adjusted, and the flow units of the ammonia gas changed to determine the effectiveness of the filter medium under different conditions. A breakthrough time in excess of 60 minutes was targeted. The results are provided in Table 7.

TABLE 7

Ammonia Breakthrough

| Example No. | Test % RH | Bed Depth Cm | Breakthrough Time, Min. | g/l NH$_3$ |
|---|---|---|---|---|
| 3 | 15 | 2 | 108 | 21.4 |
| 3 | 15 | 2 | 113 | 20.9 |
| 3 | 80 | 1.5 | 320 | 105 |
| 6 | 15 | 2 | 180 | 35.6 |
| 6 | 80 | 2 | 219 | 35.3 |
| 7 | 15 | 2 | 163 | 31.9 |
| 7 | 80 | 2 | 257 | 51.9 |
| 8 | 15 | 2 | 147 | 28.6 |
| 8 | 15 | 2 | 144 | 28.0 |
| 9 | 15 | 2 | 200 | 38.4 |
| 9 | 40 | 2 | 414 | 81.4 |
| 10 | 7 | 1 | 38 | 14.9 |
| 10 | 15 | 1 | 92 | 35 |
| 10 | 30 | 1 | 151 | 59.8 |
| 10 | 80 | 1 | 218 | 90.2 |
| 11 | 15 | 2 | 188 | 36.6 |
| 12 | 23 | 1.5 | 71 | 25.6 |
| 12 | 72 | 1.5 | 124 | 36.6 |
| 14 | 80 | 1 | 230 | 98.5 |
| 16 | 15 | 1 | 125 | 45.1 |
| 17 | 80 | 1 | 220 | 79.2 |
| Comp. 1 | 15 | 1 | 34 | 12.1 |
| Comp. 1 | 80 | 1 | 27 | 11.4 |
| Comp. 2 | 15 | 1 | 72 | 15.2 |
| Comp. 3 | 15 | 1 | 20 | 7.2 |
| Comp 4 | 15 | 1 | 5 | 2.3 |
| Comp 4 | 80 | 1 | 8.5 | 3.8 |

Figure 2:
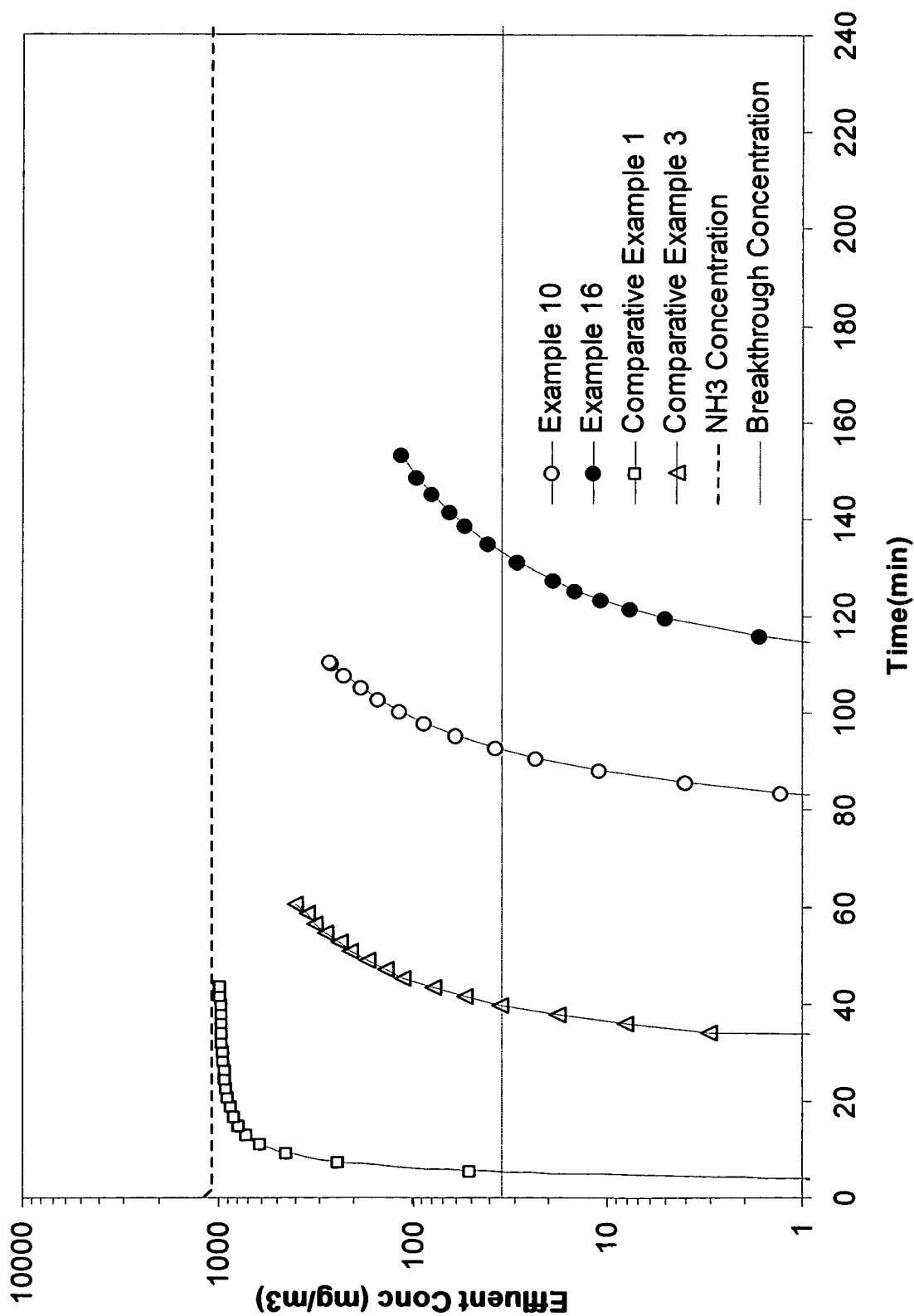
FIG. 2 is a graphical representation relating to selected portions of information provided within TABLE 7, in terms of concentration of ammonia to breakthrough by the noted inventive and comparative and filter media materials over time.

The inventive products clearly provided extremely high breakthrough levels, and particularly exceeded the 60 minute threshold by wide margins, showing the unexpectedly good results for such materials. FIG. 2 shows graphically the stark differences between the inventive and comparative examples in terms of breakthrough concentration. The total ammonia concentration was set at 1000 mg/m$^3$ while the breakthrough concentration was much lower (the higher the time measurement at the breakthrough concentration, the more effective the filter medium). Clearly, the inventive examples provided much better ammonia removal performance over time at a set ammonia concentration. Of note as well is the fact that the results within FIG. 2 actually reflect the excellent performance of the inventive examples at 15% relative humidity versus the comparative examples at the same humidity level.

Ammonia Regeneration After Breakthrough Measurements

Another method to assess the irreversibility of a given adsorbent is through a regeneration study. The starting material was equilibrated at the ammonia feed concentration of about 1,000 mg/m$^3$ to establish the breakthrough time for a new material and to completely equilibrate the sample with ammonia at 1,000 mg/m$^3$. After exposure to ammonia, the adsorbent was divided into two different samples. One sample was regenerated using procedure (1) below and the other sample is regenerated using procedure (2), below.

Procedure (1) Vacuum regeneration:

25 g of NH$_3$ post-breakthrough filter medium was subjected to 14 mBar Hg of vacuum for 4 hr at 125° C. The resultant sample was sieved on a stack of 2 U.S. Standard Mesh screens size 20 mesh and 40 mesh to recover silicic acid adsorbent base particles sized between 850 μm and 425 μm. and subsequently retested for NH$_3$ breakthrough under the conditions outlined in the test method, above.

Procedure (2) Thermal Regeneration:

25 g sample of NH$_3$ post-breakthrough filter medium was heated to 250° C. for 4 hr in a furnace in an air environment. The resultant sample was sieved on a stack of 2 U.S. Standard Mesh screens size 20 mesh and 40 mesh to recover silicic acid adsorbent base particles sized between 850 μm and 425 μm. and subsequently tested for NH$_3$ breakthrough under the conditions outlined in the test method, above.

Figure 3:
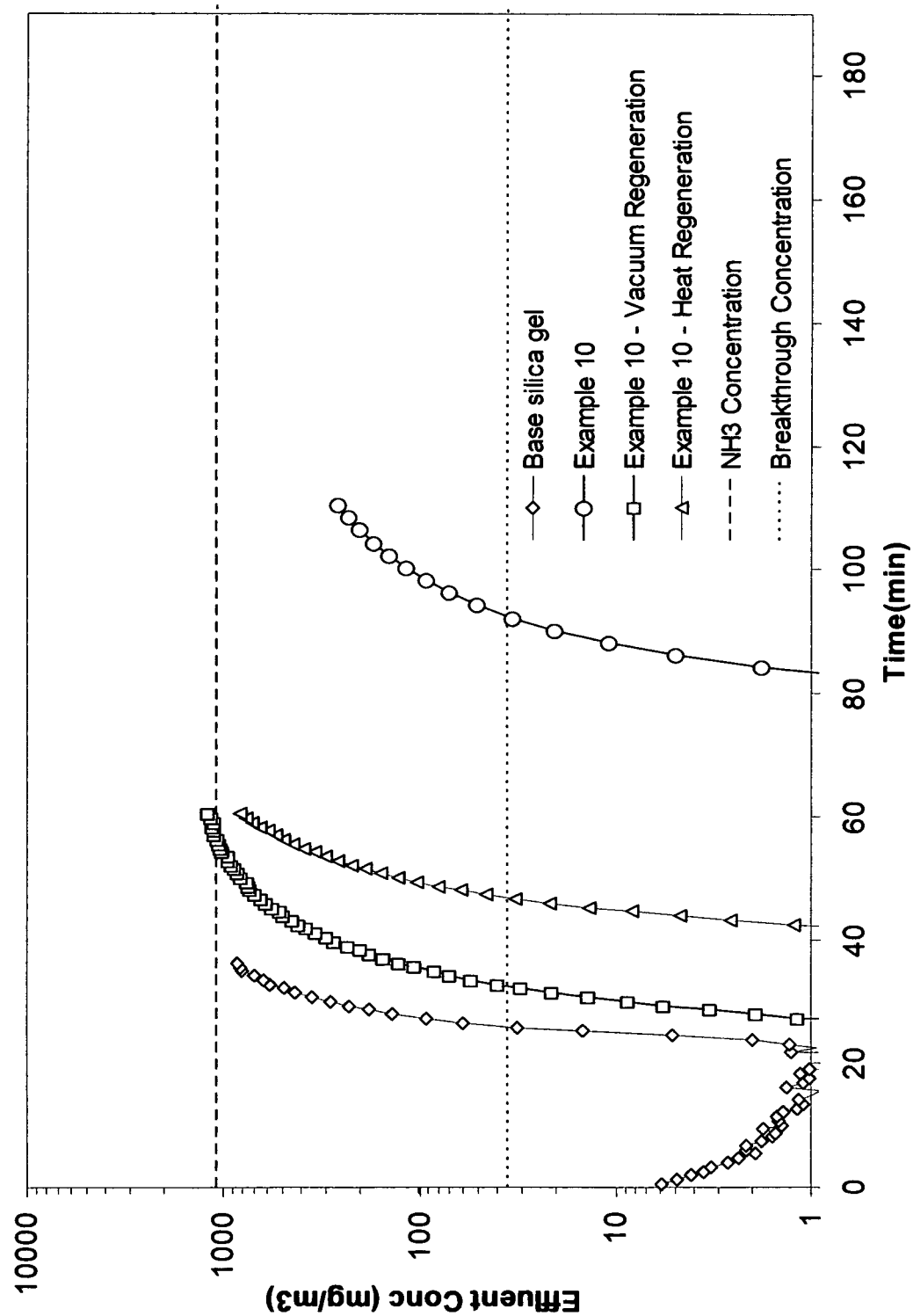
FIG. 3 is a graphical representation relating to effluent concentration over time for certain inventive and comparative filter media materials after breakthrough has been achieved and thus further ammonia uptake is performed to test the reversible potential for such subject test materials.

Provided in FIG. 3 are the results for the two regenerated samples tested using the same challenge conditions as the original sample. Also shown is data for unimpregnated particles of silicon-based gel of Examples 6-12, identified on FIG. 3 as "Base silica gel". Based on breakthrough time both of the regenerated samples recovered less than 50% of their original ammonia capacity comparable to that of the Base silica gel. Therefore, for all practical purposes, the regenerated material can now process less than ½ of the total ammonia of the original unexposed material. Inventive Example 10 material has irreversible sites for ammonia, and therefore is not suitable for cyclic processes. Coupled with the breakthrough data after regeneration has been attempted, this shows that the inventive filter medium is irreversible due to the effectiveness of the material to capture permanently the target ammonia chemically within the metal-impregnated pores.

Ammonia Elution Related to Regeneration Capability

Another technique to evaluate the reversibility of an adsorbed species on a selected adsorbent is to perform an elution test. An average concentration of chemical (1,000 mg/m$^3$ for the tests described here) was fed to a fixed bed of adsorbent until the adsorbent becomes saturated. The time required for the effluent concentration to reach the established breakthrough concentration (for ammonia this was been established to be 35 mg/m$^3$) was determined. A new adsorbent bed with the exact same bed depth was packed and the chemical feed concentration was established at 1,000 mg/m$^3$ again. This subsequent time the chemical feed was inactivated at a time corresponding to 90% of the breakthrough time previously measured. Clean air at the same flow rate continued to be passed through the adsorbent until the target chemical was eventually eluted through the bed. The area under the elution curve was calculated to determine the mass of chemical desorbed during the elution process. Such a value can be divided by the total mass that was introduced during the feed step to calculate the percent mass removed of the target chemical. The more irreversibly held the chemical was, the smaller this fraction was determined to be. Also, the maximum effluent concentration that was achievable was measured. The smaller this value, the more irreversibly held the target chemical was within the bed.

Figure 4:
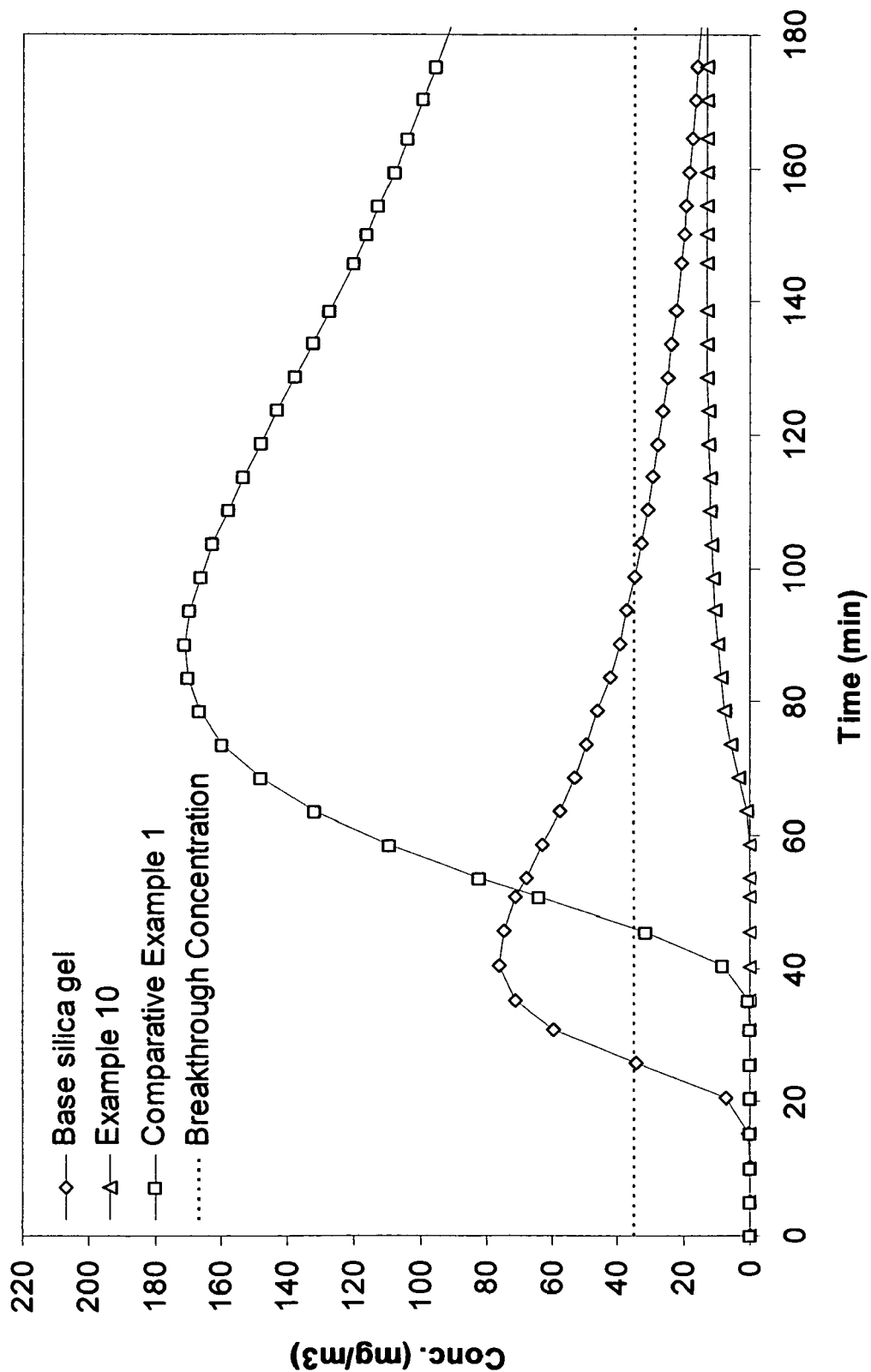
FIG. 4 is a graphical representation relating to effluent concentration over time for certain inventive and comparative filter media materials after breakthrough has been achieved and samples are purged with clean air to further test the reversible potential and chemical reactivity for such subject test materials.

Provided in FIG. 4 is a comparison of three adsorbents, Comparative Examples 1 and Example 10 and unimpregnated particles of silicon-based gel of Examples 6-12, identified on FIG. 4 as "Base silica gel". The bed depth for each adsorbent was 1 cm and the feed air flow rate was set to 4.4 SLPM (Standard at 0° C. and 1 atm) which for a 4.1-cm diameter tube corresponds to a superficial velocity of 6.0 cm/sec at 25° C. The feed RH was fixed at 15% and the temperature was controlled at 25° C. (±1° C.). Since each sample filter medium exhibits a different capacity for ammonia at the feed concentration of 1,000 mg/m$^3$, the time for inactivation of the feed gas for each sample was different.

Table 8 below summarizes the elution results. The lowest capacity material is the Base silica gel since it reaches 90% of its breakthrough time at 13.5 minutes. The highest capacity material is Example 10 that takes 63 minutes to reach 90% of its breakthrough time.

The most reversible material is the Comparative Example 1. After two hours of elution with clean air, about 69% of the total mass of ammonia adsorbed was removed from the bed. The percent eluted for the Base silica gel was only 46% and for Example 10 was only 3%. Example 10 is the most irreversible ammonia adsorbent based on the percent ammonia recovered. A second number that reflects irreversibility is the maximum effluent concentration during the elution step. The values are consistent with the elution percentage numbers. The most irreversible adsorbent based on maximum concentration was Example 10 at 12 mg/m$^3$. The most easily reversible adsorbent is the Comparative Example 1 with a maximum concentration of 170 mg/m$^3$.

Finally, when one considers the intended use of the proposed material, the effectiveness in total amount of ammonia as removed from the subject environment (i.e., within a stated volume, thus) is paramount as well. Thus, Example 10 is the best of the three materials tested. In addition, for many protection applications the filter must continue to be used even when the chemical threat has subsided. Therefore, the ability to retain the ammonia during a reasonable period of time following an exposure is a critical function.

Both Comparative Examples 1 and the unimpregnated Base silica gel exhibit effluent concentrations during elution that are greater than the threshold breakthrough concentration. Example 10, on the other hand, never produces an effluent concentration above 12 mg/m$^3$, well below the allowable effluent concentration. With a breakthrough concentration of about 35 mg/m3 for all three examples, only the inventive example exhibited elution of ammonia gas subsequent to initial breakthrough that is below such breakthrough concentration. As such, the inventive filter medium was considered to be nonregenerative since the ammonia that was initially captured was not released from the complexes on and within the pores of the inventive metal-doped silicon-based gel in an amount that exceeded breakthrough concentration; for this inventive example, the actual amount of elution did not even reach 50% of breakthrough concentration, whereas the comparative examples exhibited initial attainment of breakthrough concentration. Such a result thus shows the regenerative capacity of such comparative materials versus the inventive metal-doped types.

TABLE 9

Effect of Humidity on Breakthrough

| Example No. | Test % RH | Bed Depth Cm | Breakthrough Time, Min. | g/l NH$_3$ |
|---|---|---|---|---|
| 10 | 15 | 1 | 92.5 | 35.6 |
| 10 | 30 | 1 | 144 | 59.8 |

TABLE 8

Summary of Elution Test Results

| Adsorbent | Chemical Off, min. | Mass fed, mg. | Mass eluted at 180 minutes, mg. | Percent eluted | Maximum concentration, mg NH$_3$/m$^3$ |
|---|---|---|---|---|---|
| Comparative Example 1 | 45 | 168 | 116 | 69% | 170 |
| Base silica gel | 25 | 65 | 30 | 46% | 75 |
| Example 10 | 75 | 303 | 9 | 3% | 12 |

TABLE 9-continued

Effect of Humidity on Breakthrough

| Example No. | Test % RH | Bed Depth Cm | Breakthrough Time, Min. | g/l NH$_3$ |
|---|---|---|---|---|
| 10 | 50 | 1 | 154 | 72 |
| 10 | 60 | 1 | 226 | 88.6 |

Upon visual inspection, the filter medium was light blue before it was exposed to ammonia. Upon such exposure, the filter medium turned a very dark blue, thus providing an empirical manner of determining effectiveness of the filter medium as well.

While the invention was described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalents thereto.

What we claim is:

1. A filter medium comprising multivalent metal-doped silicon-based gel materials, wherein said filter medium exhibits a breakthrough measurement for an ammonia gas/air composition of at least 60 minutes a) when present as a filter bed of 1 cm in height within a flask of a diameter of 4.1 cm, b) when exposed to a constant ammonia gas concentration of 1000 mg/m$^3$ ammonia gas at ambient temperature and pressure, and c) when exposed simultaneously to a relative humidity of 15%; and wherein said filter medium, after breakthrough concentration of 35 mg/m$^3$ is reached, does not exhibit any ammonia gas elution in excess of said breakthrough concentration.

2. The filter medium of claim 1 wherein said materials exhibit a BET surface area of between than 100 and 300 m$^2$/g; a pore volume of between about 0.18 cc/g to about 0.7 cc/g as measured by nitrogen porosimetry; a cumulative surface area measured for all pores having a size between 20 and 40 Å of between 50 and 150 m$^2$/g; and wherein the multivalent metal doped on and within said silicon-based gel materials is present in an amount of from 5 to 25% by weight of the total amount of the silicon-based gel materials.

3. The filter medium of claim 2 wherein said BET surface area is between 150 m$^2$/g and 250 m$^2$/g; a pore volume of between about 0.25 to about 0.5 cc/g; a cumulative surface area measured for all pores having a size between 20 and 40 Å of between 80 and 120 m$^2$/g; wherein said multivalent metal is present in an amount of from about 8 to about 20%.

4. The filter medium of claim 1 wherein said multivalent metal is selected from the group consisting of cobalt, iron, manganese, zinc, aluminum, chromium, copper, tin, antimony, tungsten, indium, silver, gold, platinum, mercury, palladium, cadmium, nickel, and any combinations thereof.

5. The filter medium of claim 4 wherein said multivalent metal is copper.

6. The filter medium of claim 1 wherein said breakthrough time is at least 120 minutes.

7. A filter system comprising the filter medium of claim 1.

8. A filter medium comprising multivalent metal-doped silicon-based gel materials, wherein said filter medium exhibits a breakthrough measurement for an ammonia gas/air composition of at least 60 minutes a) when present as a filter bed of 1 cm in height within a flask of a diameter of 4.1 cm, b) when exposed to a constant ammonia gas concentration of 1000 mg/m$^3$ ammonia gas at ambient temperature and pressure, and c) when exposed simultaneously to a relative humidity of 80%; and wherein said filter medium, after breakthrough concentration of 35 mg/m$^3$ is reached, does not exhibit any ammonia gas elution in excess of said breakthrough concentration.

9. The filter medium of claim 8 wherein said materials exhibit a BET surface area of between than 100 and 300 m$^2$/g; a pore volume of between about 0.18 cc/g to about 0.7 cc/g as measured by nitrogen porosimetry; a cumulative surface area measured for all pores having a size between 20 and 40 Å of between 50 and 150 m$^2$/g; and wherein the multivalent metal doped on and within said silicon-based gel materials is present in an amount of from 5 to 25% by weight of the total amount of the silicon-based gel materials.

10. The filter medium of claim 9 wherein said BET surface area is between 150 m$^2$/g and 250 m$^2$/g; a pore volume of between about 0.25 to about 0.5 cc/g; a cumulative surface area measured for all pores having a size between 20 and 40 Å of between 80 and 120 m$^2$/g; wherein said multivalent metal is present in an amount of from about 8 to about 20%.

11. The filter medium of claim 8 wherein said multivalent metal is selected from the group consisting of cobalt, iron, manganese, zinc, aluminum, chromium, copper, tin, antimony, tungsten, indium, silver, gold, platinum, mercury, palladium, cadmium, nickel, and any combinations thereof.

12. The filter medium of claim 11 wherein said multivalent metal is copper.

13. The filter medium of claim 8 wherein said breakthrough time is at least 120 minutes.

14. A filter system comprising the filter medium of claim 8.

* * * * *